United States Patent [19]

Inoue et al.

[11] 4,196,996
[45] Apr. 8, 1980

[54] SHUTTER FOR CAMERAS

[75] Inventors: Nobuyoshi Inoue, Kawagoe; Osamu Ooba, Matsudo, both of Japan

[73] Assignee: Copal Company Limited, Tokyo, Japan

[21] Appl. No.: 568

[22] Filed: Jan. 2, 1979

Related U.S. Application Data

[63] Continuation of Ser. No. 913,446, Jun. 7, 1978, abandoned, which is a continuation of Ser. No. 731,819, Oct. 12, 1976, abandoned.

[30] Foreign Application Priority Data

Oct. 13, 1975 [JP] Japan ................... 50-123093
Feb. 19, 1976 [JP] Japan ................... 51-17231

[51] Int. Cl.² .................... G03B 9/58; G03B 9/64
[52] U.S. Cl. ........................... 354/259; 354/239
[58] Field of Search ............. 354/226, 241, 251, 256, 354/259, 250, 237, 239

[56] References Cited

U.S. PATENT DOCUMENTS 3,825,940   7/1974   Hayami ..................... 354/241
3,946,413   3/1976   Onda et al. ................ 354/251

*Primary Examiner*—Donald A. Griffin
*Attorney, Agent, or Firm*—Cushman, Darby & Cushman

[57] ABSTRACT

A shutter for cameras comprising a control cam, a starting lever to be used to release the control cam in the cocked state and bring a gear governor into an operatable state, a governor lever engageable with the control cam to operate the gear governor and a stopper capable of absorbing the inertia force of the governor lever to stop the motion of the governor lever, so that the gear governor for controlling the shutter speed may always operate positively over a long period and the operating sound of the shutter may be made low.

6 Claims, 12 Drawing Figures

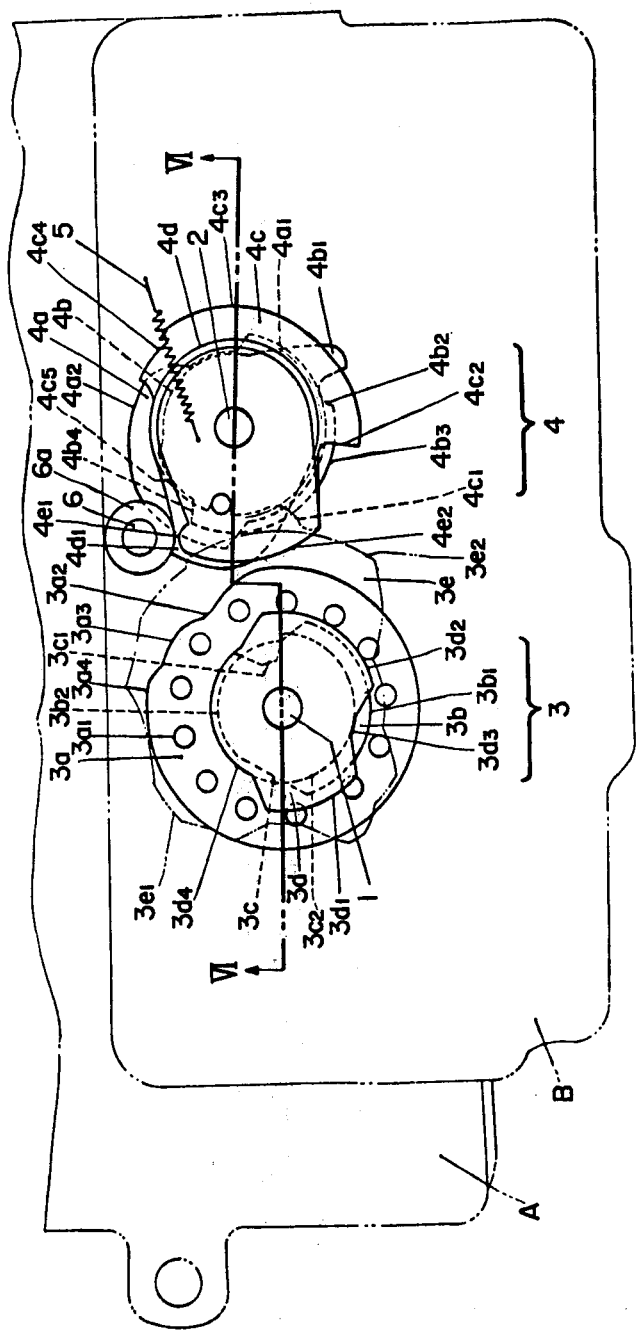
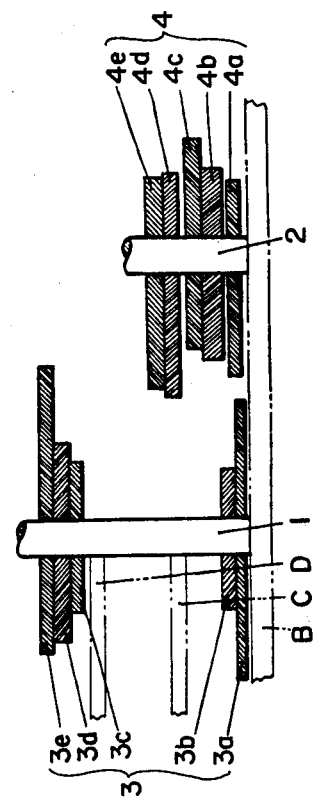
FIG. 5
FIG. 6

SHUTTER FOR CAMERAS

This is a continuation of application Ser. No. 913,446 filed June 7, 1978 and now abandoned, which was a continuation of application Ser. No. 731,819 filed Oct. 12, 1976 and now abandoned.

BACKGROUND OF THE INVENTION (a) Field of the Invention

The present invention relates to shutters for cameras, and more particularly, to a shutter for cameras arranged so that the shutter speed may be controlled by a gear governor.

(b) Description of the Prior Art

Generally, the gear governor to be used to control the shutter speed, that is, the exposure time consists of a gear train including an escape wheel and an anchor removably meshing with the escape wheel.

The conventional focal plane shutter is so arranged that the operations of meshing and separating the escape wheel and anchor may be made by a control cam for controlling the opening and closing of the shutter. As a result, in the operation of the shutter, the time interval until the operation as a governor is begun after the anchor is meshed with the escape wheel will be so short that the operation as a governor will be forced before the anchor is completely meshed with the escape wheel. Further, the mass of the above mentioned control cam is so comparatively small that the force for driving the governor will be likely to fluctuate. For the above mentioned reasons, in the conventional focal plane shutter, there has been a defect that particularly, in the low shutter speed range, that is, in the case that the exposure time of the shutter is comparatively long, the exposure time to be controlled will be inaccurate.

Further, in the gear governor to be used for the above mentioned object, particularly, in the terminal range of the gear train, not only each gear will rotate at a high speed but also its rotation will be started and stopped momentarily and, at the time of stopping it, a quick reversing action will occur due to the reaction by the inertia. This will be repeated whenever the shutter is operated. Therefore, the gears and pinions forming the gear train will be destroyed and the bearing parts will be broken so often as to be a main cause of the failure of the governor. In fact, most of the failures of the shutter are occupied by the failures of this kind of governors.

SUMMARY OF THE INVENTION

Therefore, a primary object of the present invention is to provide a shutter for cameras wherein the operation as a governor is begun only after the escape wheel is completely meshed with the anchor so that an accurate exposure time may be always obtained even in a low shutter speed range.

Another object of the present invention is to provide a shutter for cameras wherein the inertia force generated at the time of stopping the operation of the governor can be effectively absorbed so that the initial performance may be kept over a long period without particularly elevating the cost.

A further object of the present invention is to provide a shutter for cameras wherein the impact sound generated at the time of stopping the operation of the governor can be reduced so that the entire operating sound may be reduced.

BRIEF DESCRIPTION OF THE DRAWINGS

FIG. 5 is an elevational view showing the details of only a set cam and control cam;

FIG. 6 is a sectional view along line VI—VI in FIG. 5;

DESCRIPTION OF THE PREFERRED EMBODIMENTS

Figure 9:
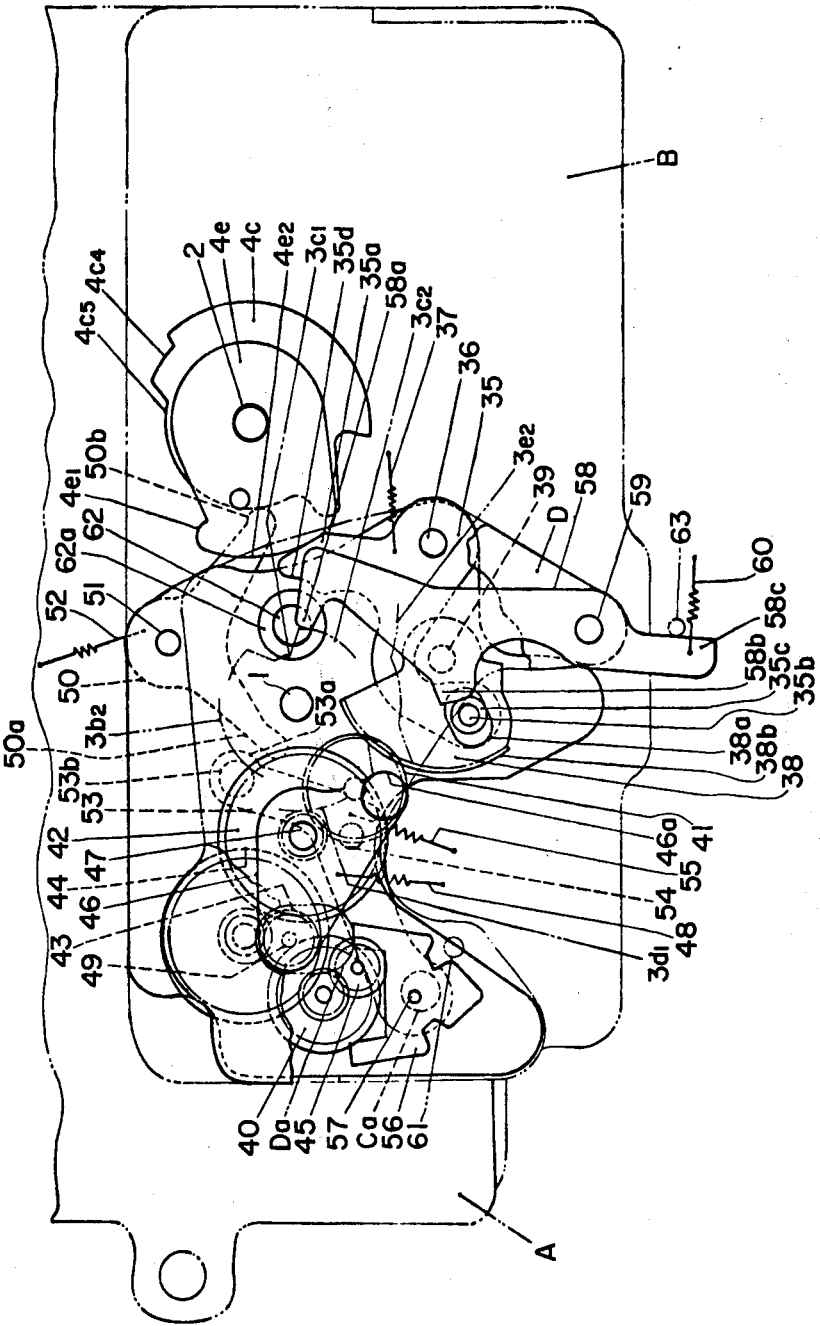
FIG. 9 is an elevational view showing a shutter speed controlling governor block as seen along line IX—IX in FIG. 4.
Figure 10:
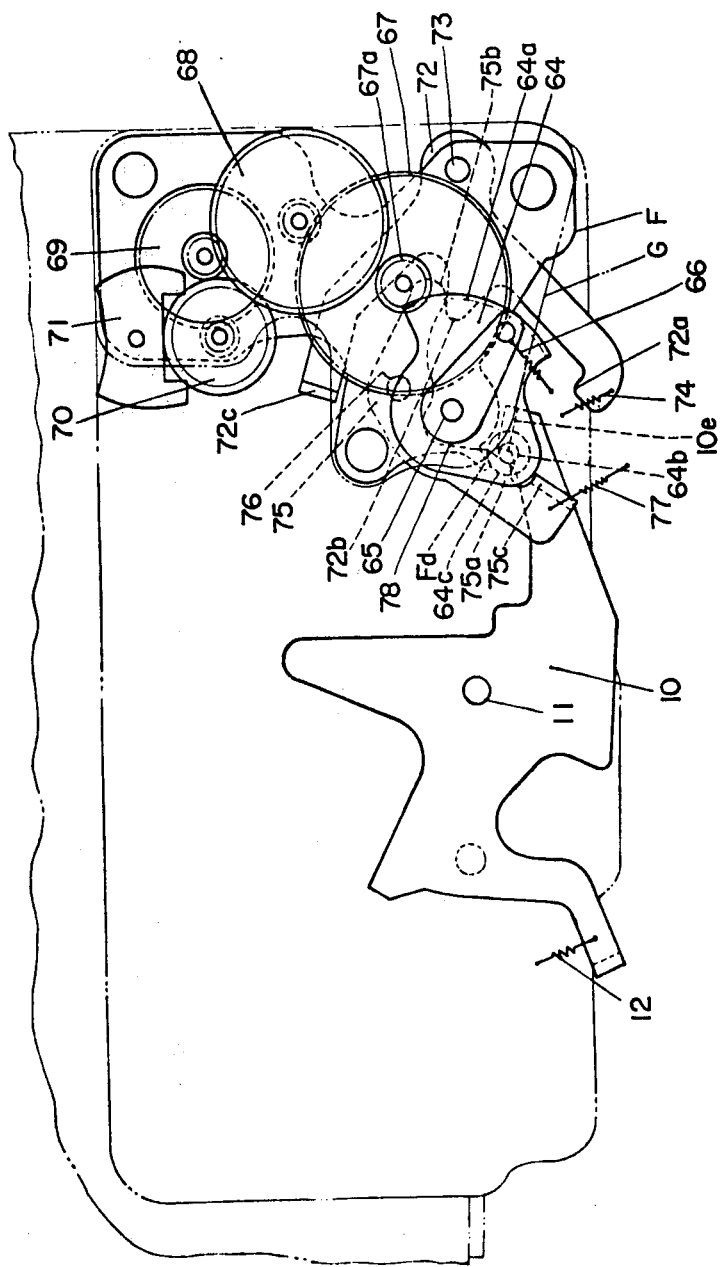
FIG. 10 is an elevational view showing a self-timer block as seen along line X—X in FIG. 4.
Figure 11:
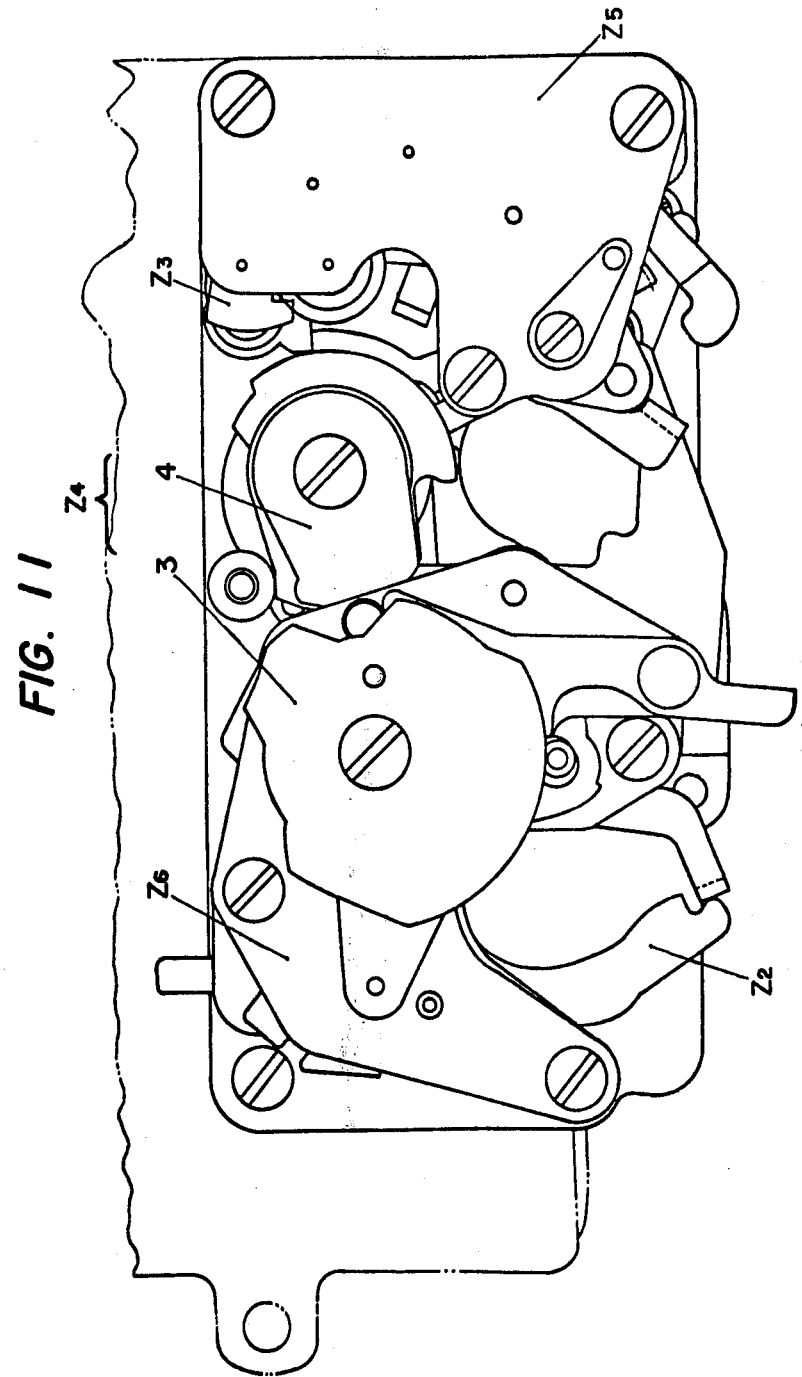
FIG. 11 is an elevational view showing another embodiment of the shutter opening and closing actuation controlling device part according to the present invention.
Figure 12:
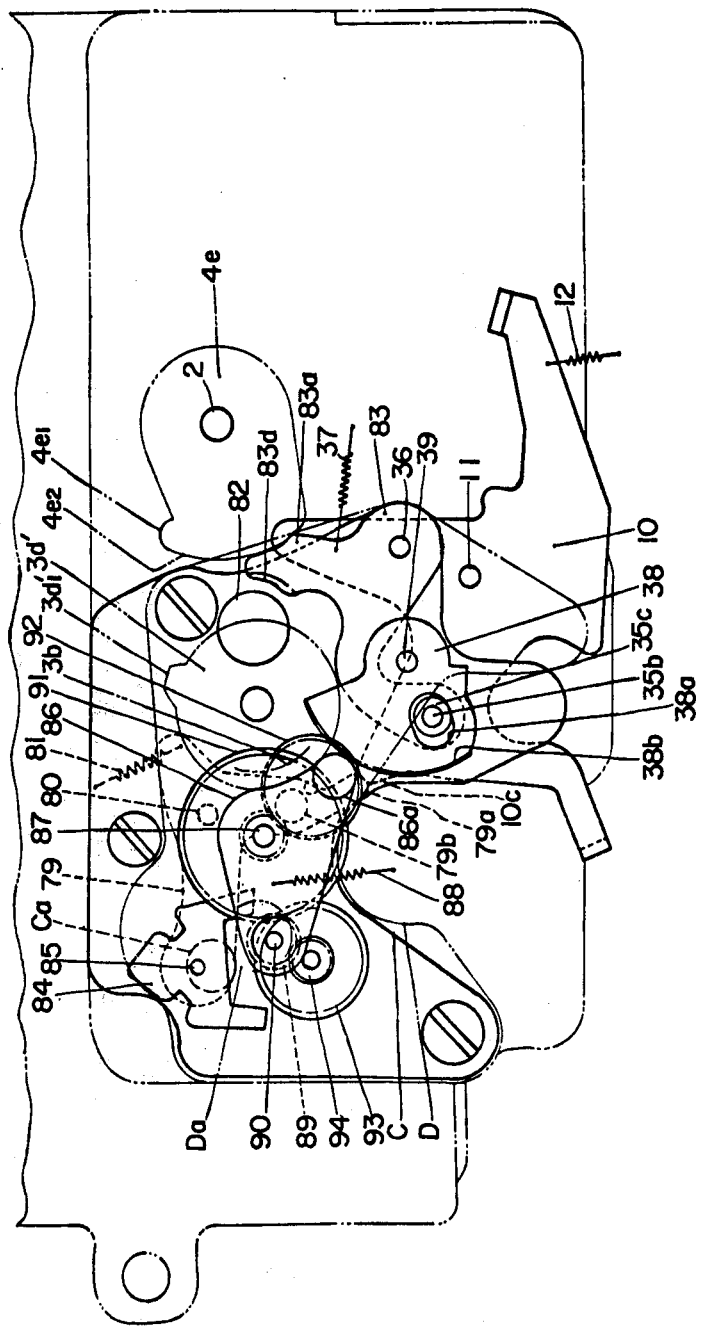
FIG. 12 is an elevational view showing the shutter speed controlling governor block by the embodiment shown in FIG. 11 as seen along line XII—XII in FIG. 4.

The first embodiment of the present invention is shown in FIGS. 1 to 10 and the second embodiment of the present invention is shown in FIGS. 11 and 12. As regards the second embodiment, only the parts different from those of the first embodiment are shown in FIGS. 11 and 12 and the illustration and explanation of the parts identical with and similar to those of the first embodiment shall be omitted.

Figure 1:
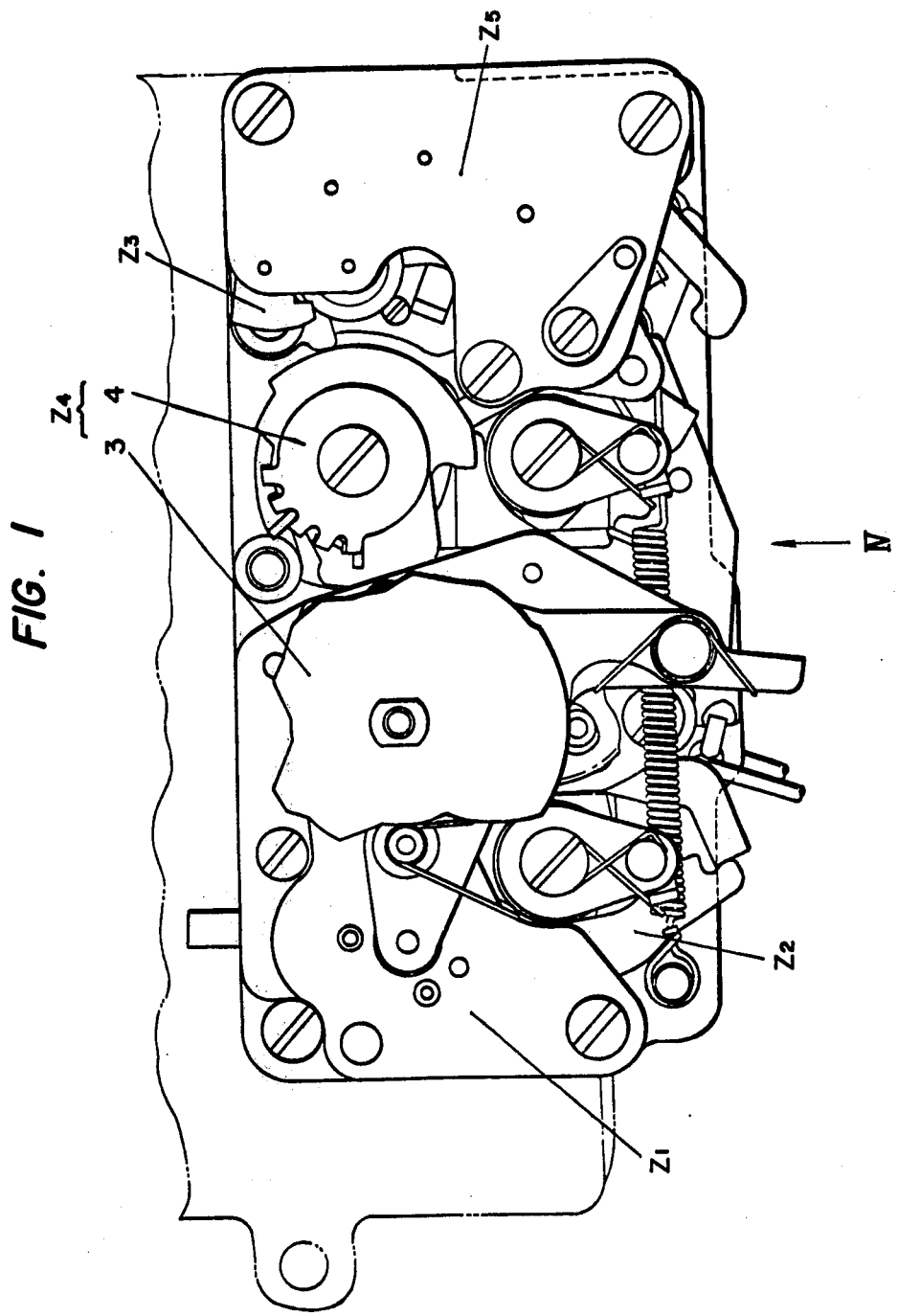
FIG. 1 is an elevational view showing an embodiment of an opening and closing actuation controlling device part of a shutter according to the present invention.

Further, throughout the first and second embodiments, the shutter is divided into the respective blocks of an exposure time (shutter speed) controlling governor block $Z_1$, opening and closing mechanism block $Z_2$, flash synchronizing governor block $Z_3$, cam block $Z_4$ and self-timer governor block $Z_5$. On the first embodiment, the entire arrangement including the respective blocks $Z_1$ to $Z_5$ is shown in FIG. 1 and the details of the respective blocks are shown in FIGS. 2 to 10. On the second embodiment, the general view is shown in FIG. 11 and the exposure time controlling governor block $Z_6$ is explained in detail in FIG. 12. On a set cam 3, by using the exposure time controlling governor block $Z_6$ having a gear train different from that of the exposure time controlling governor block $Z_1$, the contours of plate-shaped cams $3a$ to $3e$ forming the set cam 3 are different from those of the first embodiment and therefore a set cam different from the set cam 3 itself shown in FIG. 5 is used but the arrangement in the vertical direction is the same as that shown in FIG. 6, further the roles performed by the respective plate-shaped cams forming this set cam are common, therefore the illustration is omitted and only gear changing cams are shown as numerals $3d'$ and $3d_1'$ in FIG. 12.

Further, all the embodiments of the present invention are shown as embodiments adapted to a focal plane shutter of the type which is shown in such position that the exposure aperture is located in the above in the drawing and is opened and closed by shutter blades sliding in the horizontal direction in the drawing. This type of shutter shall be further explained in the following. Two sets of shutter blades to be used respectively to open and close the shutter are provided. The respective shutter blades are so formed that several thin plates supported by two arms may parallelly move. An operating habit is to be given to the respective shutter blades by independent actuating force sources. Further, a locking member to lock the shutter blades in the cocked position is provided. This type of focal plane shutter is already known. An example is mentioned in detail in German DOS No. 2441220 laid open under the date of Mar. 27, 1975. A pin $30a$ of an opening release lever 30 and a pin $16b$ of a closing release lever 16 shown in the later described embodiment of the present invention are so arranged as to be engageable respectively with locking members definitely shown in the above mentioned publication of the laid open German patent or particularly in FIG. 5, that is, locking members for holding in the cocked position the two sets of shutter blades respectively having their own actuating force sources.

First of all, the first embodiment shall be explained with reference to the drawings. As shown in detail particularly in FIGS. 3 to 5, reference symbol A indicates a shutter plate having pillars $A_a$, $A_b$ and $A_c$ and a stopper pin $A_d$ and fitted with such shutter opening and closing members as shutter blades not illustrated. Symbol B indicates a base plate having holes $B_a$, $B_b$, $B_c$ and $B_d$ for operatively connecting other members described later and pillars $B_e$, $B_f$, $B_g$, $B_h$, $B_i$ and $B_j$ and secured to the shutter plate A with the pillars $A_a$ to $A_c$. Symbol C indicates a lower plate for an exposure time controlling governor having hole $C_a$ and pillars $C_b$, $C_c$ and $C_d$ and integrally fitted to the base plate B with the pillars $B_e$ to $B_g$. Symbol D indicates an upper plate for the exposure time controlling governor having hole $D_a$ and integrally fitted to the lower plate C with the pillars $C_b$, $C_c$ and $C_d$. Symbol E indicates a plate for a flash synchronizing governor having a pillar $E_a$ and integrally fitted to the base plate B with the pillars $B_h$ and $B_j$. Symbol F indicates a lower plate for a self-timer governor integrally fitted to the base plate B with the pillar $E_a$ through the pillar $B_i$ and plate E and having pillars $F_a$, $F_b$ and $F_c$ and a part $F_d$. Symbol G indicates an upper plate for the self-timer governor integrally fitted to the base plate B with the pillars $F_b$ and $F_c$ through the pillars $B_i$ and plate F. Reference numerals 1 and 2 indicate shafts rotatably supporting respectively a shutter speed setting cam and control cam described later and erected on the base plate B.

In such arrangement of the respective plates with each other as in the above, in case the pillars connecting them with each other are erected on the respective plates, the pillars themselves will not be always integrally fitted directly to the plates, for example, by caulking but such cylindrical members as columns or sleeves may be interposed between two plates and may be fastened from both sides of the two plates so as to be integrally formed. It is needless to say that such means is a conventionally used well known means.

Next, the arrangement of the cam block $Z_4$ consisting of the shutter speed setting cam and control cam shown in detail in FIGS. 5 and 6 shall be explained.

Reference numeral 3 indicates a set cam rotatably supported on the shaft 1 erected on the base plate B, made by integrally stacking five plate cams and kept in a position set by the shutter speed setting operation with a click spring not illustrated engageable with either one of a plurality of click holes $3a_1$ described later.

In the set cam 3, $3a$ indicates a slit cam forming the click holes $3a_1$ and a cam portion $3a_2$. $3b$ indicates a clutching cam forming cam portions $3b_1$ and $3b_2$. $3c$ indicates a bulb cam forming cam portions $3c_1$ and $3c_2$. $3d$ indicates a gear changing cam forming cam portions $3d_1$, $3d_2$, $3d_3$ and $3d_4$. $3e$ indicates a shutter speed controlling governor set cam forming cam portions $3e_1$ and $3e_2$.

Reference numeral 4 indicates a control cam rotatably supported on the shaft 2 erected on the base plate B, made by integrally stacking five plate cams, made rotatable clockwise by a spring 5 and having the clockwise rotation thereby stopped by engaging a later described portion $4d_1$ with a ring-shaped stopper $6a$ made of such elastic material as a polyurethane resin and secured to a stopper pin 6 erected on the base plate B.

In the control cam 4, $4a$ indicates an opening release cam forming a gear portion $4a_1$ and a cam portion $4a_2$, $4b$ indicates a closing release cam forming portions $4b_1$, $4b_2$, $4b_3$ and $4b_4$. $4c$ indicates a release lock cam forming portions $4c_1$, $4c_2$, $4c_3$, $4c_4$ and $4c_5$. $4d$ indicates a stopper cam forming a portion $4d_1$. $4e$ indicates a brake cam forming portions $4e_1$ and $4e_2$.

Figure 7:
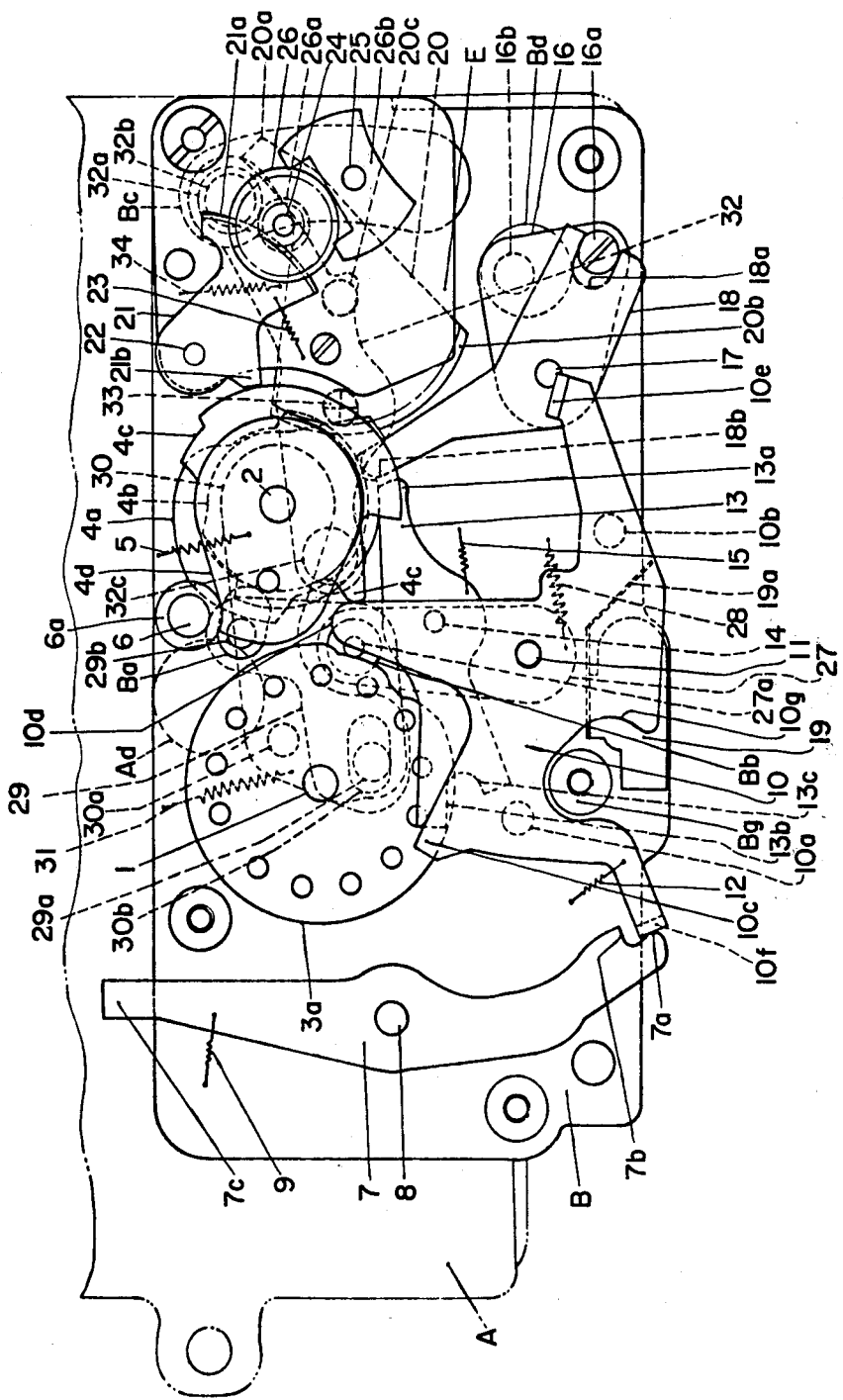
FIG. 7 is an elevational view showing the opening and closing actuation controlling device part in the uncocked state as seen along line VII—VII in FIG. 4.
Figure 8:
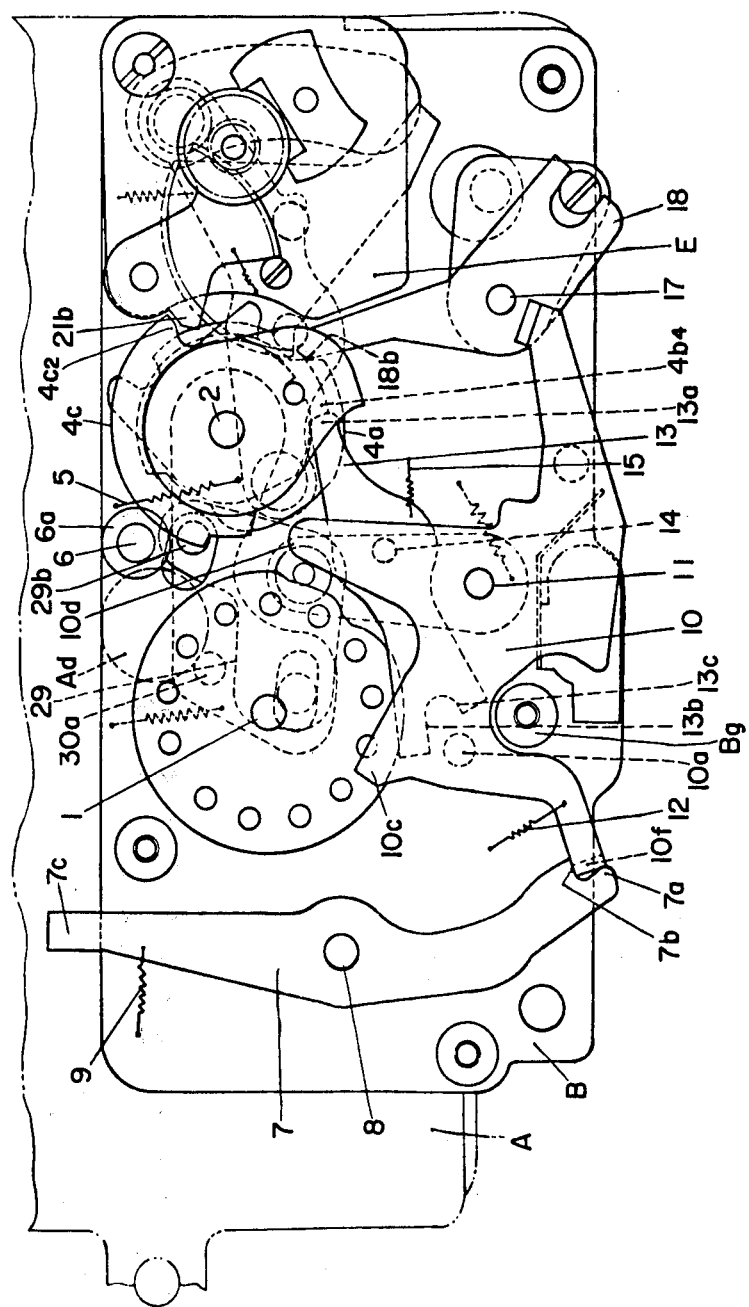
FIG. 8 is the same elevational view as in FIG. 7 in the cocked state.

Next, the arrangements of the shutter opening and closing mechanism block $Z_2$ and flash synchronizing governor block $Z_3$ shown in detail particularly in FIGS. 7 and 8 shall be explained.

In FIGS. 7 and 8, only the slit cam $3a$ is shown as the set cam 3 and the control cam 4 is shown by omitting the brake cam $4e$.

Reference numeral 7 indicates a release lever rotatably supported on the base plate B by a shaft 8, made rotatable counterclockwise by a spring 9 and forming portions $7a$, $7b$ and $7c$. Numeral 10 indicates a starting lever rotatably supported on the base plate B by a shaft 11, made rotatable clockwise by a spring 12 and having a pin $10a$, conductive pin $10b$, portions $10c$ and $10d$, bend $10e$, bend $10f$ engageable with the portions $7a$ and $7b$ and portion $10g$ engageable with the pillar $B_g$. Numeral 13 indicates a lock lever rotatably supported on the base plate B by a shaft 14, made rotatable counterclockwise by a spring 15 and having a portion $13a$ engageable with the portion $4b_4$ of the release cam $4b$ and portions $13b$ and $13c$ engageable with the pin $10a$ of the starting lever 10. Numeral 16 indicates a closing release lever rotatably supported on the base plate B by a shaft 17 and having an eccentric pin $16a$ and a pin $16b$ which can unlock a shutter blade closing actuating member not illustrated by engaging with a member for locking said closing actuating member through the hole $Bd$ in the base plate B. Numeral 18 indicates a closing release connecting lever rotatably supported by a shaft 17, having a fork $18a$ holding the pin $16a$ and an arm $18b$ held by the portions $4b_1$ and $4b_2$ of the closing release cam $4b$ and restricted in the clockwise rotation by being stopped by the flash synchronizing governor plate E at the time of the clockwise rotation and made adjustable in the relative position with the closing release lever 16 by rotating the pin $16a$. Numeral 19 indicates a flash synchronizing contact for a flash circuit in the case of using an M-class or FP-class flash bulb, secured as insulated to the base plate B and having a flexible arm $19a$ contactable with the pin 10b of the starting lever 10. Numeral 20 indicates a cocking gear rotatably supported by a shaft 20c between the base plate B and flash synchronizing governor plate E and having an arm 20a and a gear 20b meshing with the gear $4a_1$ of the opening release cam 4a. Numeral 21 indicates a sector gear rotatably supported on the flash synchronizing governor plate E by a shaft 22, made rotatable clockwise by a spring 23, forming a flash synchronizing governor together with an escape wheel 26 and anchor 26b rotatably supported on the flash synchronizing governor plate E respectively by shafts 24 and 25 and having a gear portion 21a meshing with a pinion 26a integral with the escape wheel 26 and a portion 21b engageable with the portions $4c_2$ and $4c_3$ of the release lock cam 4c.

In FIGS. 7 and 8, the members to be arranged on the back side of the base plate B and clearly shown in FIG. 2 shall be explained in the following.

Figure 2:
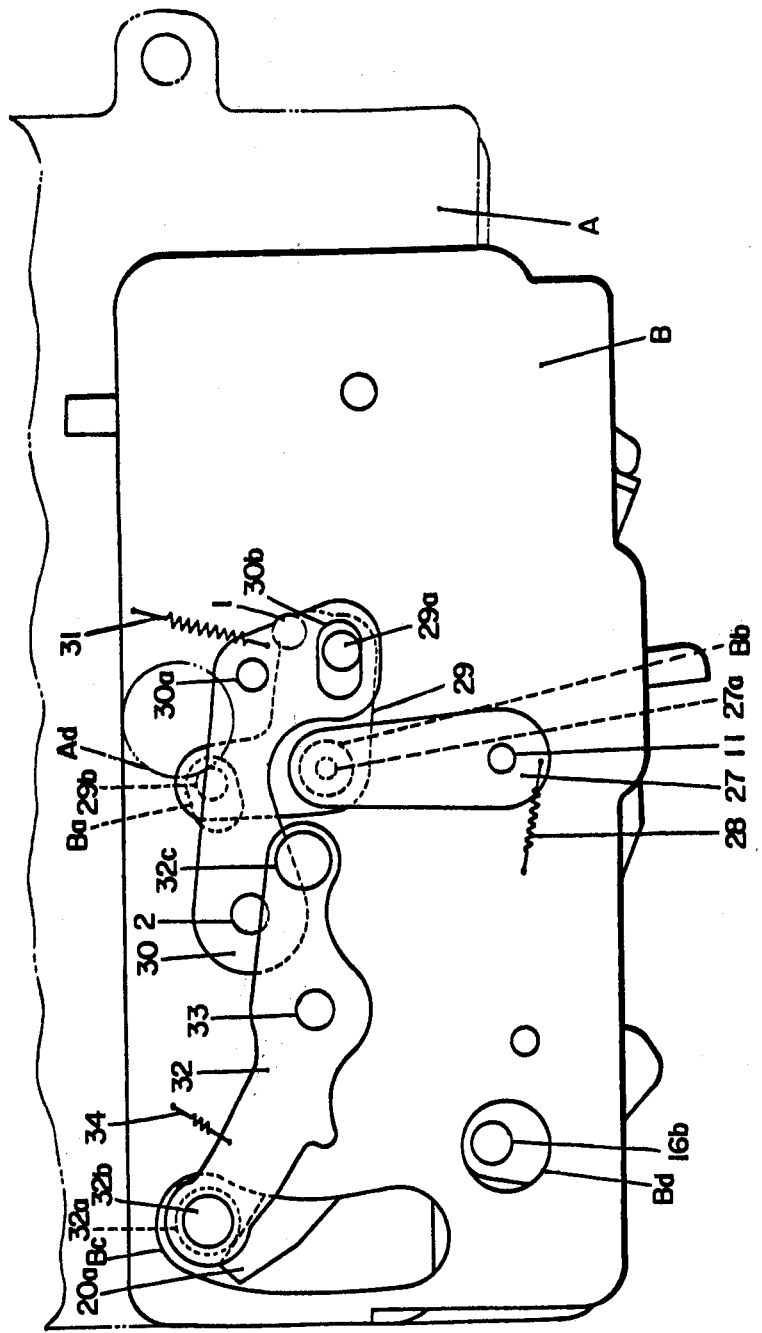
FIG. 2 is a back view of FIG. 1.
Figure 3:
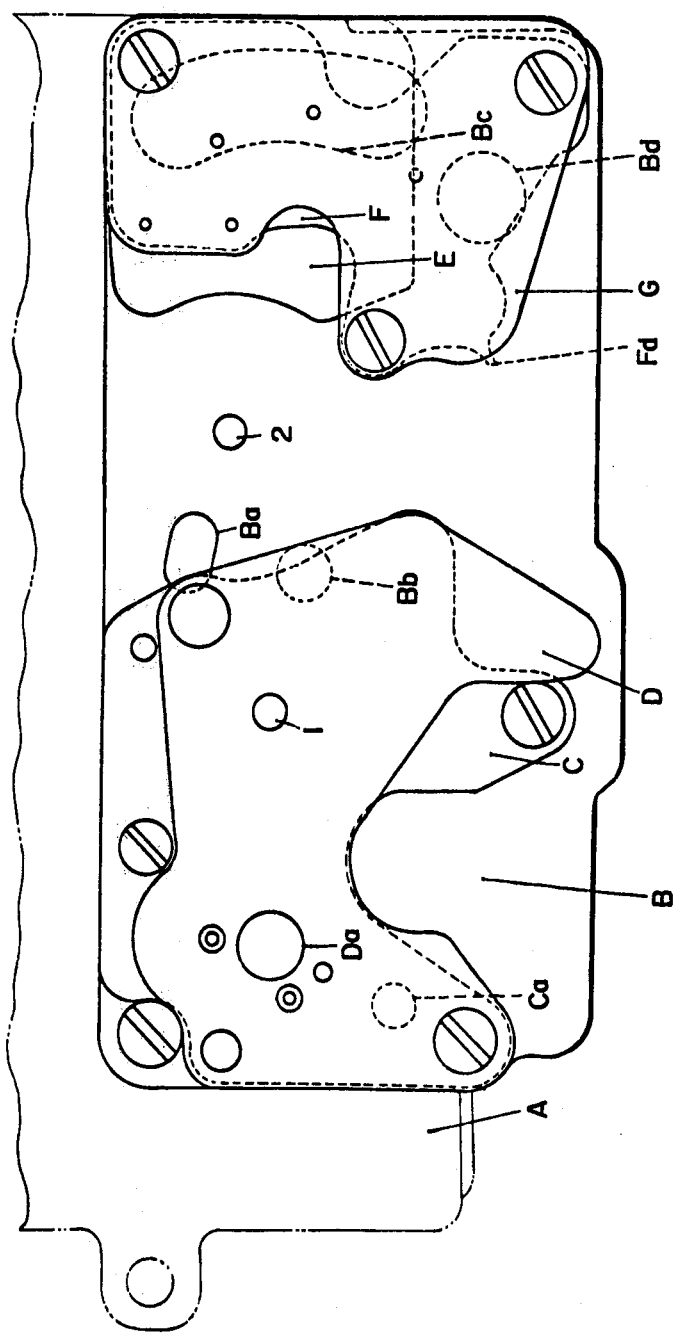
FIG. 3 is an elevational view showing only the assembly of the respective base plates of the device part shown in FIG. 1.
Figure 4:
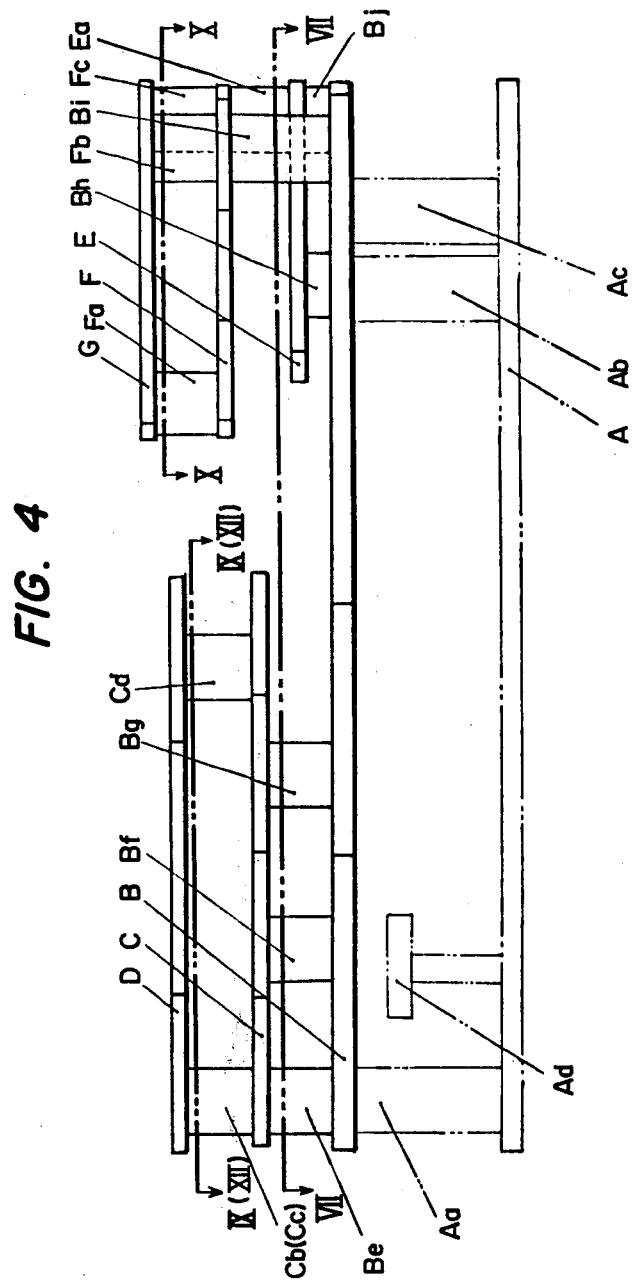
FIG. 4 is a side view showing only the assembly of the respective base plates as seen along the arrow IV in FIG. 1.

In FIG. 2, reference numeral 27 indicates a slit lever rotatably supported on the base plate B by the shaft 11, made rotatable clockwise by a spring 28, having a pin 27a passing through the hole $B_b$ in the base plate B and stopped in the clockwise rotation by the engagement of the pin 27a with the cam portion $3a_2$ of the slit cam 3a. Numeral 29 indicates an opening release interlocking lever rotatably supported on the slit lever 27 by the pin 27a and having a pin 29a and a pin 29b engageable with the cam portion $4a_2$ of the opening release cam 4a through the hole $B_a$ in the base plate B. Numeral 30 indicates an opening release lever rotatably supported on the base plate B by the shaft 2, made rotatable counterclockwise by a spring 31, having a pin 30a which can unlock a shutter blade opening actuating member not illustrated in the above mentioned focal plane shutter by engaging with a member for locking said opening actuating member and a slot 3b pin-slot connected with a pin 29a of the opening release interlocking lever 29 and controlled by the collision of the pin 30a with the stopper $A_d$ of the shutter plate A when rotated counterclockwise by a spring 31. Numeral 32 indicates a cocking lever rotatably supported on the base plate B by the shaft 3, made rotatable clockwise by a spring 34, fitted rotatably with a roller 32a engaging with the arm 20a of the cocking gear 20 through the hole $B_c$ in the base plate B and having a pin 32b projected also on the other side, that is, on the front side in FIG. 2 and related with the cocking and film winding device of the camera not illustrated and a pin 32c related with a shutter blade actuating mechanism of the shutter not illustrated.

Next, the exposure time controlling governor block $Z_1$ and bulb controlling mechanism shown in detail particularly in FIG. 9 shall be explained.

In FIG. 9, reference numeral 35 indicates a governor lever rotatably supported between the lower plate C and upper plate D by a shaft 36, made rotatable clockwise by a spring 37 and having a portion 35a engageable with the portion $4e_1$ of the brake cam 4e, a pin 35b engageable with the cam portion $3e_1$ of the exposure time controlling governor setting cam 3e, a pin 35c coaxially integral with the pin 35b and pin-slot connected with a slot 38a of a sector gear 38 described later and an end portion 35c. The sector gear 38 is rotatably supported between the lower plate C and upper plate D by a shaft 39 and has the slot 38a connected with the pin 35c and a gear 38b. Numeral 40 indicates an escape wheel driven by the gear 38b through gears 41 and 42, a changing gear 43 and a gear 44 or 45. Numeral 46 indicates a gear changing lever rotatably supported on the upper side of the upper plate D, that is, on the front side in FIG. 9 by a shaft 47, made rotatable counterclockwise by a spring 48 and having a pin 46a controlled in the counterclockwise rotating motion by the cam portion $3d_1$ of the gear changing cam 3d and a shaft 49 passed through the hole $D_a$ in the upper plate D, projected on the back side of the plate and rotatably supporting the gear 43 to selectively transmit the rotation of the gear 42 to the gear 44 or 45. Numeral 50 indicates a clutching lever rotatably supported by a shaft 51 between the lower plate C and a base plate B, made rotatable counterclockwise by a spring 52 and having an arm 50a and an arm 50b engageable with the portion $4c_4$ or $4c_5$ of the release lock cam 4. Numeral 53 indicates an anchor lever rotatably supported on the lower plate C between the base plate B and lower plate C by a shaft 54, made rotatable clockwise by a spring 55 and having an arm 53a engageable with the arm 50a and a pin 53b engageable with the cam portions $3b_1$ and $3b_2$ of the clutching cam 3b. Numeral 56 indicates an anchor rotatably supported on the anchor lever 53 between the lower plate C and upper plate D by a shaft 57 passing through the hole $C_a$ in the lower plate C and meshable with the anchor gear 40. Numeral 58 indicates a bulb lever rotatably supported by a shaft 59 on the front side of the upper plate D, made rotatable counterclockwise by a spring 60 and having an end portion 58a engageable with the cam portions $3c_1$ and $3c_2$ of the bulb cam 3c, a portion 58b engaging with the pin 35b of the governor lever 35 and a portion 58c engaging with a later described pin 63. Numeral 61 indicates a stopper pin for the anchor 56 erected on the back side of the upper plate D. Numeral 52 indicates a stopper pin erected on the lower plate and having a ring-shaped stopper 62a made of such elastic body as, for example, a polyurethane resin secured to it. The portion 35d of the governor lever 35 is made engageable with this stopper 62 so that the governor lever 35 rotated against the spring 37 may be prevented from making an inertia operation with the inertia of its rotation. Numeral 63 indicates a pin operatively connected with a release operating mechanism not illustrated so as to prevent the counterclockwise rotation of the above described bulb lever 58 by engaging with the portion 58c in case no releasing operation is made and to unlock the bulb lever 58 by moving rightward in FIG. 9 at the time of the releasing operation.

Next, the constitution of the self-timer block $Z_5$ shown in detail particularly in FIG. 10 shall be explained.

In FIG. 10, numeral 64 indicates a timer sector gear rotatably supported by a shaft 65 between the lower plate F and upper plate G of the self-timer governor, made rotatable clockwise, having a gear portion 64 and pins 64b and 64c and having the clockwise rotation restricted by the engagement of the pin 64c with the portion $F_d$ of the lower plate F. The gear portion 64a meshes with a pinion 67a connected with a gear 67 through a known ratchet mechanism and further the gear 67 is connected with a timer gear governor consisting of gears 68 and 69, an escape wheel 70 and anchor 71. Numeral 72 indicates a timer stop lever rotatably supported on the underside of the lower plate F by a shaft 73, made rotatable clockwise by a spring 74 and having portions 72a and 72b and a bend 72c engageable with the anchor 70. Numeral 75 indicates a timer release lever rotatably supported on the underside of the lower plate F by a shaft 76, made rotatable counterclockwise by a spring 77 and having a portion 75a engageable with the pin 64b, a portion 75b engaging with the portion 72b and a bend 75c engageable with the bend 10e of the starting lever 10. Numeral 78 indicates a cocking lever integral with the timer sector gear 64.

The operation of the above explained apparatus shall be explained in the following.

First of all, the shutter cocking operation shall be explained.

The shutter is cocked by clockwise rotating the cocking lever 32 against the spring 34 around the shaft 33.

When the cocking lever 32 is rotated clockwise, the pin 32b projected from the back side to the front side of the base plate B through the hole $B_c$ in the base plate B will push the arm 20a through the roller 32a to rotate the cocking gear 20 clockwise so that the control cam 4 may be rotated counterclockwise through the meshing of the gear 20b with the gear $4a_1$.

By the counterclockwise rotation of the control cam 4, the portion $4b_4$ of the closing release cam 4b will be engaged with the portion 13a so that the control cam 4 may be locked by the lock lever 13 as rotated counterclockwise against the spring 5. By the clockwise rotating operation of the cocking lever 32 by the cocking operation, the cocking lever 32 will be engaged with the shutter blade actuating mechanism not illustrated by the pin 32c so that the shutter opening actuating spring and shutter closing actuating spring may be simultaneously cocked.

On the other hand, in the counterclockwise rotating operation stroke by the above mentioned cocking operation, the control cam 4 will be operated as follows by the cams 4a to 4e.

That is to say, with the opening release cam 4a, by the displacement of the cam portion $4a_2$, the pin 29 engaged with it will follow to operate, the opening release interlocking lever 29 made rotatable clockwise by the spring 31 through the pin 29a and slot 30b and the opening release lever 30 will respectively rotate clockwise around the shafts 27a and 2 and the pin 30a will be stopped by the stopper pin $A_d$.

With its counterclockwise rotating operation, the closing release cam 4b will push the arm 18b with its portion $4b_2$ to rotate clockwise the closing release connecting lever 18 together with the closing release lever 16 integral with it and the arm 18b will run on the portion $4b_3$ and will approach the flash synchronizing governor plate E so that the closing release connecting lever 18 and the closing release lever 16 integral with it may be moved to be held in the position shown in FIG. 8 from the state illustrated in FIG. 7, that is, the release position.

By the counterclockwise rotating operation of the release lock cam 4c, its portion $4c_1$ will separate from the portion 10d so that the starting lever 10 may be rotated clockwise by the spring 12 until the bend 10f contacts the portion 7b. Further, the portion $4c_3$ will disengage from the portion 21b so that the sector gear 21 may be rotated clockwise by the spring 23 until its portion 21b is stopped by the portion $4c_2$. The clutching lever 50 having been prevented from rotating counterclockwise by the engagement of the arm 50b with the portion $4c_5$ as shown in FIG. 9 will be rotated clockwise by the engagement of the arm 50b with the portion $4c_4$ and will push the arm 53a with the other arm 50a to rotate the anchor lever 53 counterclockwise to disengage the anchor 56 from the escape wheel 40.

By the counterclockwise rotation of the stopper cam 4d, the portion $4d_1$ will be separated from the stopper 6a. Further, as shown in detail in FIG. 9, when the portion $4e_2$ retreats from the portion 35a, the brake cam 4e will allow the governor lever 35 to be rotated clockwise by the spring 37.

The shutter is cocked as in the above so that the shutter opening and closing mechanism may come to be in the cocked state shown in FIG. 8 from the uncocked state shown in FIG. 7.

Besides such shutter cocking operation as in the above, a shutter speed setting operation is made before photographing. This setting operation can be made either before or after the shutter cocking operation.

The above mentioned shutter speed setting operation is made by rotating the set cam 3 operatively connected with a setting operation member not illustrated around the shaft 1.

The shutter speed setting operation shall be explained in the following.

The shutter speed controlling governor shown in FIG. 9 and the set cam 3 shown in FIGS. 5 and 6 show an embodiment wherein the shutter speed can be changed in a total of 13 steps including 12 steps of 1 to 1/2000 second and "B", that is, a bulb exposure operation and, among them, the shutter speeds in 10 steps of "B" and 1 to 1/250 second are controlled by the shutter speed controlling governor and the shutter speeds in 3 steps of 1/500 to 1/2000 second are controlled by the set cam 3.

When the set cam 3 is rotated, the shutter speed controlling governor and other members will operate as follows.

In case the shutter speed is set at "B" or between 1 and 1/250 second by operating the setting operation member not illustrated, for example, the shutter speed dial, the dial 3e will control the operating range of the pin 35b by its cam portion $3e_2$ and, in case the shutter speed is set at the other times, that is, between 1/500 and 1/2000 second, the pin 35b will be pushed up by the cam $3e_1$ and the portion 35a will be moved out of the operating locus of the portion $4e_1$ of the brake cam 4e against the spring 37 so that the shutter speed controlling governor may no longer relate to the shutter.

Then, in case the shutter speed is set at "B" or between 1 and 1/30 second, the pin 53b will be engageable with the cam $3b_2$ of the clutching cam 3b so that the anchor 56 rotatably supported on the anchor lever 53 may mesh with the escape wheel 40. This meshing will be made when the shutter is uncocked as illustrated in FIG. 9 or is opened for exposure as described later, that is, when the arm 50b is engaged with the portion $4c_5$. When the shutter speed is set otherwise than is mentioned above, the cam portion $3b_1$ will push the pin 53b to rotate the anchor lever 53 counterclockwise against the spring 55 so that the anchor 56 may be separated from the escape wheel 40.

Next, in case the shutter speed is set between 1 and ¼ second, the cam portion $3d_1$ of the gear changing cam 3d will push the pin 46a to mesh the changing gear 43 with the pinion integral with the gear 44 so that the escapement gear 40 may be operated through said gear 40 at a speed higher than through the gear 45.

In case the shutter speed is set between ⅛ and 1/125 second, the pin 46a will engage with the cam portion $3d_4$ so that the changing gear 43 may mesh with the gear 45 and the escapement gear 40 may be operated through it.

In case the shutter speed is set between 1/250 and 1/2000 second, the pin 46a will engage with the cam portion $3d_2$ so that the changing gear 43 may be placed in a position intermediate between the gear 45 and the pinion integral with the gear 44 and may not mesh with any other gear than the gear 42 with which it always meshes. Therefore, the escapement means consisting of the escape wheel 40 and anchor 56 will no longer operate as a shutter speed controlling governor.

Now, when the shutter speed is set at "B", as regards the set cam 3e and clutching cam 3b, as mentioned above, the operating range of the pin 35b will be controlled by the cam portion $3e_2$, the pin 53b will engage with the cam portion $3b_2$ to mesh the gear 40 with the anchor 56 and further the gear changing cam 3d will have the cam portion $3d_3$ as high as the cam portion $3d_4$ opposed to the pin 46a so that the changing gear 43 may be meshed with the gear 45. The cam portion $3c_1$ of the bulb cam 3c will be opposed to the portion 58a of the bulb lever 58 and therefore the portion 58a of the bulb lever 58 will not be stopped. By the way, in case the shutter speed is set otherwise than at "B", the bulb cam 3c will have its cam portion $3c_2$ always opposed to the portion 58a to prevent the counterclockwise rotation of the bulb lever 58.

Next, the case that the shutter speed is set between 1/500 and 1/2000 second shall be explained.

As already explained, the shutter speed above 1/500 second is controlled by the size of the slit formed by the shutter blades without using the shutter speed controlling governor. This slit is controlled by making the time of the shutter closing operation constant and controlling the time of the opening operation.

As shown in detail in FIGS. 5 and 7, the above mentioned time of the opening operation is controlled by setting the position of the pin 29b of the opening release interlocking lever 29 for the slit cam 4a of the control cam 4.

This setting operation shall be explained in the following.

In case the shutter speed is set at 1/500 second, the slit controlling cam 3a of the set cam 3 will engage with the pin 27a through its cam portion $3a_4$. Thereby, when the shutter is cocked, the opening release interlocking lever 29 will be moved in the most rightward moved position without substantially rotating around the pin 27a and therefore the pin 29b will be also moved in a position moved rightward, that is, adjacent to the control cam 4. When the shutter speed is set at a higher speed, that is, at 1/1000 second, the lower cam portion $3a_3$ will engage with the pin 27a. When it is set at 1/2000 second, the still lower cam portion $3a_2$ will engage with the pin 27a and the pin 29b will be set to separate further from the control cam 4.

The shutter is cocked and the shutter speed is set as in the above. The shutter opening and closing operation by the releasing operation shall be explained in the following.

The shutter is released by operating a shutter release operating member not illustrated. With the operation of the shutter release operating member, the pin 63 will first move rightward in FIG. 9 and will then push the portion 7c to rotate the release lever 7 clockwise.

As shown in FIG. 7, with the clockwise rotation of the release lever 7, the bend 10f will be unlocked from the portion 7b, the starting lever 10 will rotate clockwise and the portion 13b will be pushed by the pin 10a to rotate the lock lever 13 clockwise. In this case, the pin 10a will come between the portions 13b and 13c to prevent the lock lever 13 from being rotated clockwise by the inertia more than is necessary. Further, the starting lever 10 will contact the arm 19a of the flash synchronizing-contact 19 with its pin 10b to switch on the M-class or FP-class flash synchronizing circuit not illustrated and will be finally stopped by the collision of the portion 10g with pillar Cd.

The control cam 4 will be rotated clockwise by the actuating spring 5 when the lock lever 13 is rotated clockwise by the shutter release operation. However, this clockwise rotating motion will be delayed by the flash synchronizing governor $Z_3$ consisting of the sector gear 21, pinion 2ba, escape wheel 26 and anchor 26b. As a result, the shutter opening period will be delayed by the time matching the time until the maximum brightness is reached after the M-class or FP-class bulb is ignited.

After the portion $4c_2$ of the control cam 4 is disengaged from the portion 21b, the pin 29b will be first pushed up by the cam portion $4a_2$ of the opening release cam 4a so that the opening release interlocking lever 29 may rotate counterclockwise around the pin 27a and the opening release lever 30 may be rotated counterclockwise by the pin 29a around the shaft 2. As a result, the locking mumber of the shutter blade opening actuating mumber not illustrated will be operated by the pin 30a to start the shutter opening operation. In this case, if the shutter speed is set at 1/2000 second, the pin 29b will be in a position separate from the control cam 4 and will be therefore operated as delayed by a predetermined time after the control cam 4 is started. In case the shutter speed is set at 1/500 second or at a value slower than it, it will be operated earlier than the above mentioned predetermined time so that the shutter opening operation may be started earlier.

In case the shutter speed is set at a value slower than 1/500 second, that is, in case the shutter speed controlling governor is used, with the further continuing clockwise rotation of the control cam 4, the brake cam 4e will engage with the portion 35a with its portion $4e_1$ and will push it to rotate the governor lever 35 counterclockwise and operate the shutter speed controlling governor so that the clockwise rotating motion of the control cam 4 may be delayed.

Even after passing the intersection of the operating locus of the portion 35a of the governor lever 35 and the operating locus of the portion $4e_1$ of the brake cam 4e, the governor lever 35 will continue the counterclockwise rotating motion with its inertia but this counterclockwise rotating motion will be prevented by the collision of the portion 35d with the stopper 62a. The stopper 62a which has an elasticity will slowly receive the quick operation of the governor lever 35 without momentarily repulsing it. Thereby, the governor lever 35 and the component members of the shutter speed controlling governor operatively connected with it will be stopped without being quickly reversely rotated. After the portion $4e_1$, of the brake cam 4e of the control cam 4 separates from the portion 35a of the governor lever 35, the portion $4b_3$ of the closing release cam 4b will pass the arm 18b of the closing release connecting lever 18, the tip portion of the arm 18b will drop into a recess formed by the portions $4b_1$ and $4b_2$, then the arm 18b will be pushed by the portion $4b_1$, to rotate the closing release connecting lever 18 counterclockwise and the pin 16b erected on the closing release lever 16 integral with it will be operated to start the shutter closing operation.

Simultaneously with the starting of the shutter closing operation with the clockwise rotating operation of the control cam 4, the portion 10d will be pushed by the portion 4c₁, of the release lock cam 4c to rotate the starting lever 10 counterclockwise against its spring 12.

Therefore, when the portion 4d₁, of the stopper cam 4d is stopped by the stopper 6a, the clockwise rotating operation of the control cam 4 will all end and the shutter opening and closing mechanism will return to the uncocked state shown in FIG. 7 from the cocked state shown in FIG. 8.

In case the shutter speed is set at "B", with the releasing operation, the pin 63 will first move rightward to release the portion 58c of the bulb lever 58. At this time, as the lower cam portion 3c1 of the bulb cam 3c of the set cam 3 is opposed to the portion 58a of the bulb lever 58, simultaneously with the rightward movement of the pin 63, the portion 58b will enter the operating locus of the pin 35b to lock the counterclockwise rotation of the governor lever 35. Therefore, after the control cam 4 rotates clockwise to release the shutter opening actuating member, when the portion 4e1 of the brake cam 4e engages with the portion 35a of the governor lever 35 before the shutter closing actuating member is released, the control cam 4 will be stopped by the bulb lever 58 through the governor lever 35 in such state to make a so-called bulb-exposure.

Then, the pressing operation for the releasing operation member not illustrated will be stopped so that the releasing operation member may return due to its operating habit. When the pin 63 is thereby moved leftward, the bulb lever 58 will be also rotated clockwise against the spring 60 and the portion 58b will retreat from the pin 35b to release the governor lever 35 and therefore the control cam 4 will push the governor lever 35 to further continue the clockwise rotation and will release the shutter closing actuating member to end the bulb-exposure.

The operation of the self-timer shown in FIG. 10 shall be explained in the following.

The uncocked state of the self-timer is shown in FIG. 10. The self-timer cocking operation shall be first explained in the following.

The self-timer is cocked by operating the timer cocking lever 78 to counterclockwise rotate the timer sector gear 64 integral with it and cocking the spring 66.

When the timer sector gear 64 is rotated counterclockwise, the pin 64b will also move in the counterclockwise direction, the portion 75a will follow it, the timer release lever 75 will rotate counterclockwise, the bend 75c will enter the operating range of the bend 10e of the starting lever 10 and the portion 75b will move in the counterclockwise direction to release the portion 72b and allow the timer stop lever 72 to rotate clockwise.

When the timer stop lever 72 is rotated clockwise, the bend 72c will be meshed with the escape wheel 70 to lock its rotation and the portion 72a will come into the operating range of the bend 10e of the starting lever 10.

The self-timer is cocked as in the above. The release operation shall be explained in the following.

When the shutter opening and closing mechanism shown in FIG. 7 and explained in the above is released, before the bend 10f of the starting lever 10 disengages from the portion 7b and rotates clockwise and the pin 10a reaches the portion 13b, the bend 10e will engage with the bend 75c and will be here once prevented from rotating clockwise but, on the other hand, just before it, the portion 72a will be pushed by the bend 10e to rotate the timer stop lever 72 counterclockwise and the bend 72c will be disengaged from the escape wheel 70 to unlock and start the self-timer gear governor.

The timer sector gear 64 will thereby begin to rotate clockwise and, in its final stroke, the portion 75a will be pushed by the pin 64b to rotate the timer release lever 75 clockwise and the portion 72b will be stopped by the portion 75b to prevent the clockwise rotation of the timer stop lever. Further, the bend 75c will be disengaged from the bend 10e to allow the starting lever 10 to rotate clockwise so that a series of shutter releasing operations may be started, that is to say, the lock lever 13 may be operated by the clockwise rotation of the starting lever 10 and the control cam 4 may be thereby unlocked. Thus, finally the pin 64c will be stopped by the portion Fd of the lower plate F and the uncocked state shown in FIG. 10 will return.

The second embodiment of the present invention shown in FIGS. 11 and 12 shall be explained in the following.

The second embodiment of the present invention shown in FIGS. 11 and 12 is different from the first embodiment mostly in the arrangement as already explained.

In FIG. 12, reference numeral 79 indicates an anchor lever rotatably supported by a shaft 80 on the lower plate C of the shutter speed controlling governor between the lower plate C of the shutter speed controlling governor and base plate B, made rotatable counterclockwise by a spring 81 and having a portion 79a engageable with the portion 10c of the starting lever 10 and a pin 79b engageable with the clutching cam 3b of the set cam 3. Numeral 82 indicates a stopper pin erected on the lower plate C. Numeral 83 indicates a governor lever provided with a portion 83a and a portion 83d engageable with the stopper pin 82 and having such elastic material as, for example, a polyurethane resin integrally secured to it. Numeral 84 indicates an anchor rotatably supported on the anchor lever 79 by a shaft 85 possing through the hole Ca in the lower plate C. Numeral 86 indicates a gear changing lever rotatably supported on the front side of the upper plate D by a shaft 87, made rotatable counterclockwise by a spring 88 and having a pin 86a. Numeral 89 indicates a changing gear rotatably supported on the gear changing lever 86 by a shaft 90, located between the lower plate C and upper plate D by a shaft 90 passing through the hole Da and made rotatable by the sector gear 38 through gears 91 and 92. Numeral 93 indicates an escape wheel meshing with the anchor 84 and formed integrally with a pinion 94 meshing with the changing gear 89.

In the second embodiment of the present invention constituted as in the above, the shutter speed is controlled in 6 steps of ⅛ to 1/250 second in addition to "B" by the shutter speed controlling governor and the higher shutter speeds, that is, of 1/500 to 1/1000 second are controlled by the set cam 3 independently of the shutter speed controlling governor exactly the same as in the first embodiment.

The operation of the shutter speed controlling governor of the second embodiment shown in FIG. 12 shall be explained in the following. When the shutter speed is between ⅛ and 1/30 second, by the engagement of the clutching cam 3b and pin 79b with each other, the anchor 84 will become meshable with the escape wheel 93 but, in the uncocked state, the portion 79a will be stopped by the portion 10c and therefore, until the releasing operation is made, the anchor lever 79 will not operate.

When the shutter speed is set at 1/250 second, a cam portion $3d_1$ of a gear changing cam $3d'$ will engage with the pin 86a and the changing gear 89 will disengage from the pinion 94 but will mesh with the pinion 94 in case the shutter speed is set at another speed.

When the shutter is cocked, the brake cam 4e will rotate counterclockwise and, when the portion 4e1 retreats from the portion 83a, the governor lever 83 will rotate clockwise. In this state, when the shutter speed is set between ⅛ and 1/30 second and the shutter is released, as described above, the starting lever 10 will rotate clockwise, the portion 79a will follow it and the anchor lever 79 will rotate counterclockwise.

Thereafter, when the control cam 4 rotates clockwise and the portion 4e1 of the brake cam 4e pushes the governor lever 83 to rotate it counterclockwise, the governor lever 83 will disengage from the portion 4e1 and will rotate counterclockwise due to the inertia until the portion 83d is stopped by the stopper pin 82 the same as in the case of the governor lever 35 in the first embodiment. At this time, as the portion 83d is made of such elastic material as, for example, a polyurethane resin, the energy of the collision will be absorbed, the reaction or bound of the governor lever 83 will be little and the colliding sound will be very small.

As in the above, according to the present invention, a stopper provided with such elastic member as of a polyurethane resin is fitted around a stopper pin limiting the end position of the operation of a governor lever or the elastic member is pasted to the governor lever so that, when the shutter is operated, the operation of the governor lever by the inertia after it disengages from the brake cam 4e may be stopped. However, the same effect as of this cam can be obtained by interposing such resilient means as, for example, a spring or air damper between the governor lever and its stopper pin.

As shown in common with the first and second embodiments in the above, the excess operation by the inertia of the governor lever engaged with the control cam is stopped elastically slowly. However, in the shutter speed controlling governor, the governor lever engaged with the control cam which is a member controlling the timing of the shutter opening operation and shutter closing operation in a focal plane shutter or a member opening and closing the shutter with its own actuating force in a lens shutter and thereby controlling the operating speed of the control cam is not limited to be pin-slot connected with the sector gear but may have the sector gear itself made engageable directly with the control cam. In the case of such arrangement, the excess operation by the inertia of the sector gear may be slowly stopped.

We claim:

1. A shutter for cameras, comprising: a base plate;
   a control cam rotatably supported on said base plate and movable between a cocked position and an uncocked position thereof to accurately control the time of opening and closing the shutter;
   a governor means including a governor lever rotatably supported on said base plate and engageable with said control cam;
   an escape wheel capable of being rotated by the rotation of said governor lever;
   an anchor disengageably meshed with said escape wheel and capable of delaying the moving velocity of said control cam;
   a starting means comprising a lever rotatably supported on said base plate and engageable with said control cam to lock said control cam in said cocked position;
   an anchor lever rotatably supported on said base plate and rockably supporting said anchor in one end portion and engageable with said starting lever in the other end portion; and
   means ensuring that said anchor is moved to engage with said escape wheel and said control cam is released from said cocked position when said starting lever is moved in connection with releasing the shutter, and said anchor is disengaged from said escape wheel through said starting lever as movement of said control cam from the cocked position thereof to the uncocked position thereof is concluding.

2. The shutter for cameras of claim 1, further comprising:
   a stopper erected on said base plate and engageable with said governor lever to stop the operation of said governor by quietly absorbing the energy thereof.

3. A shutter for cameras according to claim 2 wherein said stopper is formed of a substance which can absorb the inertia force of said governor lever.

4. A shutter for cameras according to claim 2 wherein said stopper is made of a polyurethane resin.

5. A shutter for cameras according to claim 2 wherein the portion to be engaged with said stopper of said governor is made of an elastic substance.

6. A shutter for cameras, comprising:
   a base plate;
   a control cam rotatably supported on said base plate and movable between a cocked position and an uncocked position thereof to accurately control the time of opening and closing the shutter;
   a governor means including a governor lever rotatably supported on said base plate and engageable with said control cam;
   an escape wheel capable of being rotated by the rotation of said governor lever;
   an anchor disengageably meshed with said escape wheel and capable of delaying the moving velocity of said control cam;
   a starting means comprising a lever rotatably supported on said base plate and engageable with said control cam to lock said control cam in said cocked position; an anchor lever rotatably supported on said base plate and rockably supported said anchor in one end portion and engageable with said starting lever in the other end portion;
   a stopper erected on said base plate and engageable with said governor lever to stop the operation of said governor by quietly absorbing the energy thereof;
   and a clutching lever rotatably supported on said base plate and engageable with said anchor in one end portion and engaged with said control cam in the other end portion, said clutching lever being disengaged from said anchor lever to engage said anchor with said escape wheel when said control cam is moved from the uncocked position thereof to the cocked position thereof and being engaged with said anchor lever to disengage said anchor from said escape wheel as movement of said control cam from the cocked position thereof to the uncocked position thereof is concluding.

* * * * *